United States Patent
Kim

(10) Patent No.: US 11,280,395 B2
(45) Date of Patent: Mar. 22, 2022

(54) HYBRID TRANSMISSION STRUCTURE

(71) Applicant: Hyundai Transys Inc., Seosan-si (KR)

(72) Inventor: Tae Hoon Kim, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 0 days.

(21) Appl. No.: 16/951,657

(22) Filed: Nov. 18, 2020

(65) Prior Publication Data

US 2021/0388893 A1  Dec. 16, 2021

(30) Foreign Application Priority Data

Jun. 16, 2020  (KR) ........................ 10-2020-0072962

(51) Int. Cl.
*F16H 57/021* (2012.01)
*F16H 57/031* (2012.01)
*F16H 57/04* (2010.01)

(52) U.S. Cl.
CPC ......... *F16H 57/021* (2013.01); *F16H 57/031* (2013.01); *F16H 57/0454* (2013.01)

(58) Field of Classification Search
CPC .............................. F16H 57/029; F16H 57/021
See application file for complete search history.

(56) References Cited

U.S. PATENT DOCUMENTS

| | | | | |
|---|---|---|---|---|
| 2008/0106163 A1* | 5/2008 | Mizuno | ................... | B60L 50/61 310/83 |
| 2010/0222171 A1* | 9/2010 | Tabata | .................... | F16H 3/728 475/5 |
| 2012/0080248 A1* | 4/2012 | Kasuya | ................... | H02K 7/006 180/65.21 |
| 2012/0242199 A1* | 9/2012 | Iwase | ..................... | H02K 7/006 310/68 B |
| 2013/0023372 A1* | 1/2013 | Sada | ........................ | B60K 6/40 475/149 |
| 2014/0124321 A1* | 5/2014 | Frait | ...................... | B60K 6/405 192/66.3 |
| 2017/0203643 A1* | 7/2017 | Suyama | .................. | F16D 21/02 |
| 2018/0031112 A1* | 2/2018 | Chae | ...................... | B60K 6/445 |
| 2018/0313411 A1* | 11/2018 | Satoyoshi | .......... | B60L 15/2054 |
| 2020/0039496 A1* | 2/2020 | Lindemann | .............. | B60K 6/40 |
| 2020/0040976 A1* | 2/2020 | Steiner | ..................... | B60K 6/48 |
| 2021/0086605 A1* | 3/2021 | Laigo | ...................... | B60K 6/26 |

FOREIGN PATENT DOCUMENTS

| | | | |
|---|---|---|---|
| JP | | 6156425 B2 | 7/2017 |
| KR | 10-2010-0015063 A | | 2/2010 |
| KR | 10-2020-0033253 A | | 3/2020 |

* cited by examiner

*Primary Examiner* — Richard W Ridley
*Assistant Examiner* — Brian J McGovern
(74) *Attorney, Agent, or Firm* — Novick, Kim & Lee, PLLC; Jae Youn Kim; Jihun Kim

(57) ABSTRACT

Provided is a hybrid transmission structure including: a housing; a motor mounted in the housing, including a rotor and a stator, and having a first boss provided at a center of the rotor; a cover having a second boss provided at a center thereof, the second boss axially installed on a power shaft and inserted into the first boss; a support member having an inner race fixedly coupled to the second boss, and an outer race inserted into a receiving portion in the rotor, and configured to support the rotor so that the rotor is rotatable; and a sealing member positioned on the inner race of the support member and provided between the power shaft and the second boss.

5 Claims, 3 Drawing Sheets

HYBRID TRANSMISSION STRUCTURE

CROSS-REFERENCE TO RELATED APPLICATIONS

This application claims priority to and the benefit of Korean Patent Application No. 10-2020-0072962 filed in the Korean Intellectual Property Office on Jun. 16, 2020, the entire contents of which are incorporated herein by reference.

TECHNICAL FIELD

The present invention relates to a hybrid transmission structure.

BACKGROUND ART

In general, a hybrid vehicle refers to a vehicle driven by an efficient combination of two or more different types of power sources. The hybrid vehicle refers to a vehicle driven by an engine which obtains rotational force by combusting fuel (fossil fuel such as gasoline), and a motor which obtains rotational force from electric power of a battery.

Research is being actively conducted on the hybrid vehicle as a future vehicle capable of reducing exhaust gas and improving fuel economy by adopting the motor as an auxiliary power source as well as the engine.

The hybrid vehicle typically uses the engine and the motor. The hybrid vehicle uses the motor, as a main power source, which has relatively good low-speed torque characteristics, at a low speed, and uses the engine, as a main power source, which has relatively good high-speed torque characteristics, at a high speed. Therefore, in a low-speed section, the hybrid vehicle uses the motor while stopping the operation of the engine that uses fossil fuel, and thus the hybrid vehicle has an excellent effect of improving fuel economy and reducing exhaust gas.

A drive device for a hybrid vehicle allows the hybrid vehicle to travel in an electric vehicle (EV) mode which is a pure electric vehicle mode in which only the rotational force of the motor is used to drive the hybrid vehicle, or in an operation mode such as a hybrid electric vehicle (HEV) mode in which the rotational force of the motor is used as auxiliary power while the rotational force of the engine is used as main power. The mode is switched from the EV mode to the HEV mode by stating the engine.

A hybrid system in the related art may have inexpensive components in comparison with a high-voltage system and may implement an output at a level corresponding to a full hybrid level within a short time by a combination of two or more motors. The hybrid system in the related art is generally classified into P0, P1, P2, P3, and P4 depending on the positions of the motor, and the respective systems have differences according to whether the EV mode is implemented, regenerative braking performance, and the like.

A P1 type hybrid structure in the related art is structured such that a stator of a P1 motor is supported by a housing, a rotor of the P1 motor is integrated with a torsion damper and connected to an engine by bolting, and the P1 motor is separated from a transmission. A stator of a P2 motor is supported by the housing, and a rotor of the P2 motor is connected to the torsion damper through an engine clutch at the inside thereof.

FIG. 1 is a view illustrating a hybrid transmission structure in the related art. Referring to FIG. 1, in the case of the hybrid transmission structure in the related art, a boss provided at a center of a rotor 2 of a motor 1 is rotatably coupled to an inner race of a bearing 3, the bearing 3 is inserted and coupled into a boss provided at a center of a cover 5 of a housing 4, and an oil seal 6 is provided in the boss of the cover 5.

However, in the hybrid transmission structure in the related art, the oil seal and the bearing are disposed in a line in the boss of the cover, and as a result, an overall length of the vehicle is inevitably increased.

In this regard, the present invention is intended to suggest a mechanism capable of reducing an overall length of the vehicle by changing a position at which the oil seal is assembled.

DOCUMENT OF RELATED ART

Patent Document (Patent Document 1) Korean Patent Application Laid-Open No. 10-2010-0015063 (published on Feb. 12, 2010)

SUMMARY OF THE INVENTION

The present invention has been made in an effort to provide a hybrid transmission structure in which a sealing member is positioned on an inner diameter portion of a support member, thereby reducing an overall length of a vehicle.

An exemplary embodiment of the present invention provides a hybrid transmission structure including: a housing; a motor mounted in the housing, including a rotor and a stator, and having a first boss provided at a center of the rotor; a cover having a second boss provided at a center thereof, the second boss axially installed on a power shaft and inserted into the first boss; a support member having an inner race fixedly coupled to the second boss, and an outer race inserted into a receiving portion in the rotor, and configured to support the rotor so that the rotor is rotatable; and a sealing member positioned on the inner race of the support member and provided between the power shaft and the second boss.

The support member may be a bearing.

The sealing member may be an oil seal.

The hybrid transmission structure may further include a coupling member coupled to a tip of the second boss which is exposed through the inner race of the support member.

The coupling member may be a nut thread-coupled to the tip of the second boss.

A transmission input shaft may be inserted into the power shaft, and a support bearing may be provided between the transmission input shaft and the power shaft.

According to the present invention, the sealing member may be designed to be mounted on the inner race of the support member, thereby reducing the overall length of the vehicle.

According to the present invention, the coupling member may be thread-coupled to the tip of the second boss of the cover so as to securely fix the support member, thereby minimizing a sway of the rotor that occurs when the rotor rotates, and thus improving performance of the motor.

According to the present invention, the distance from the cover to an engine may be minimized in comparison with the configuration in the related art in which the support member and the sealing member are disposed in a line, and as a result, it is possible to improve mountability of components mounted in a hybrid transmission.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
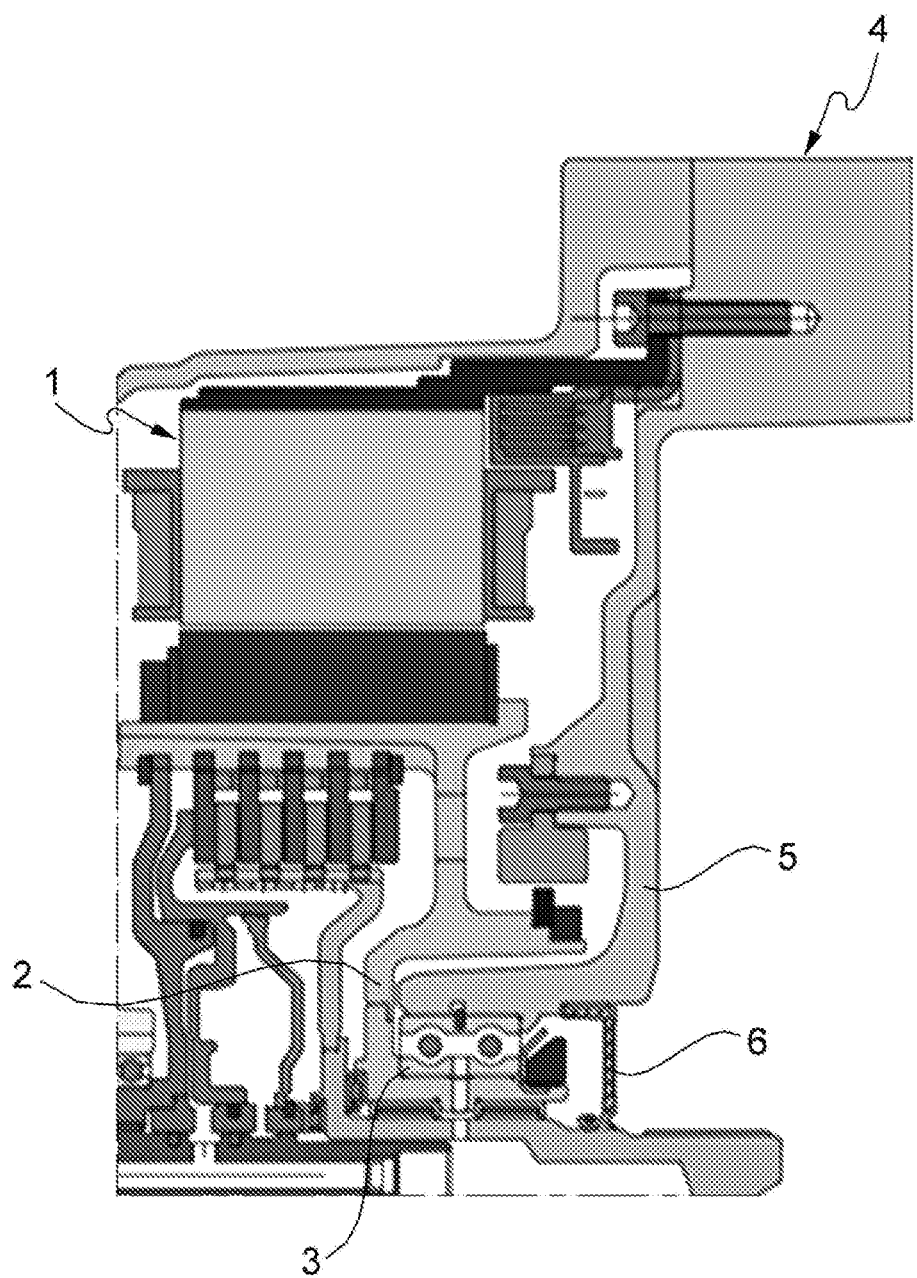
FIG. 1 is a view illustrating a hybrid transmission structure in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

In the hybrid transmission structure in the related art, an oil seal and a bearing are disposed in a line in a boss of a cover, and as a result, an overall length of a vehicle is inevitably increased. In this regard, the present invention is intended to suggest a mechanism capable of reducing an overall length of the vehicle by changing a position at which the oil seal is assembled.

Figure 2:
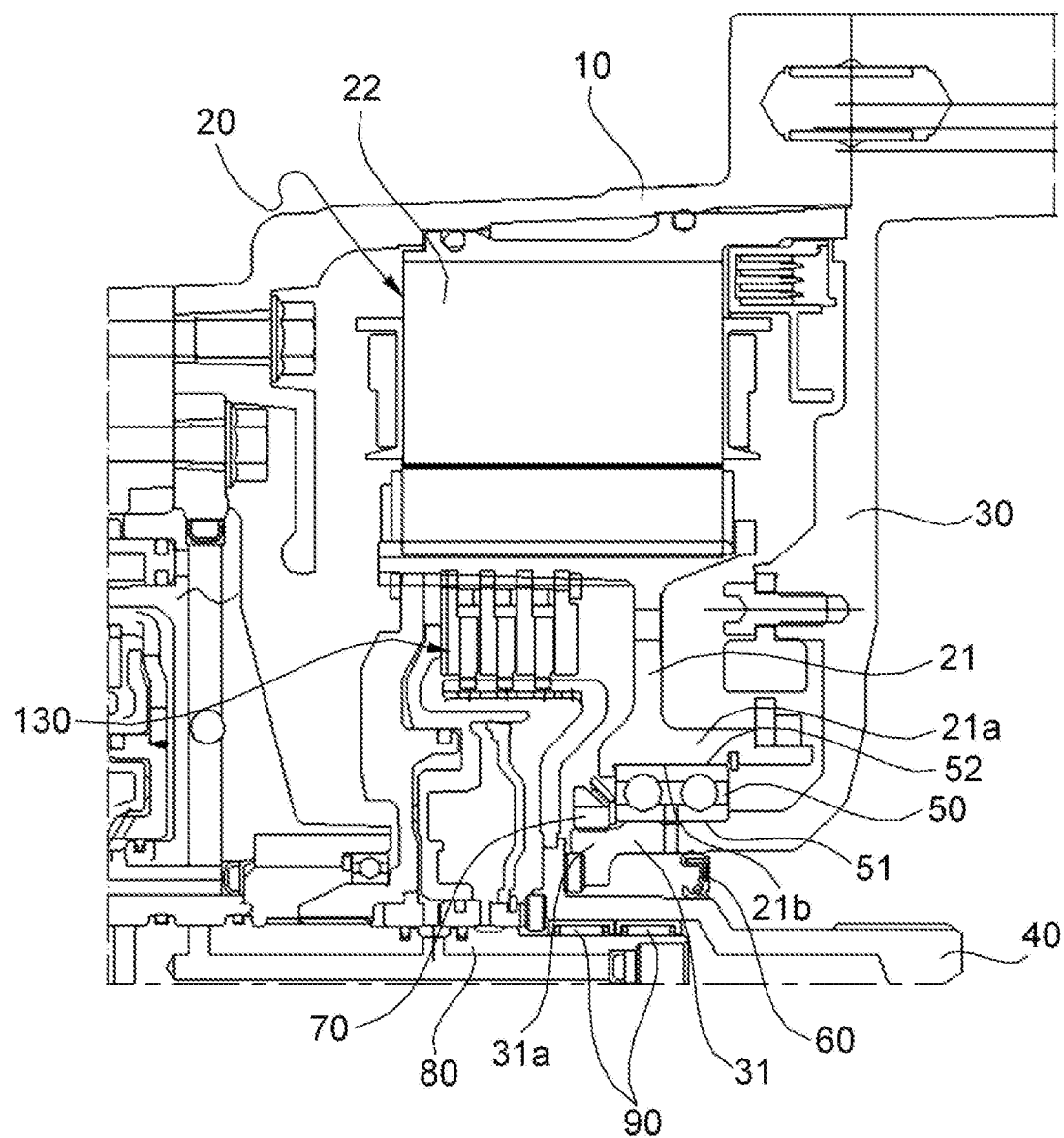
FIG. 2 is a cross-sectional side view illustrating a hybrid transmission structure according to an exemplary embodiment of the present invention.
Figure 3:
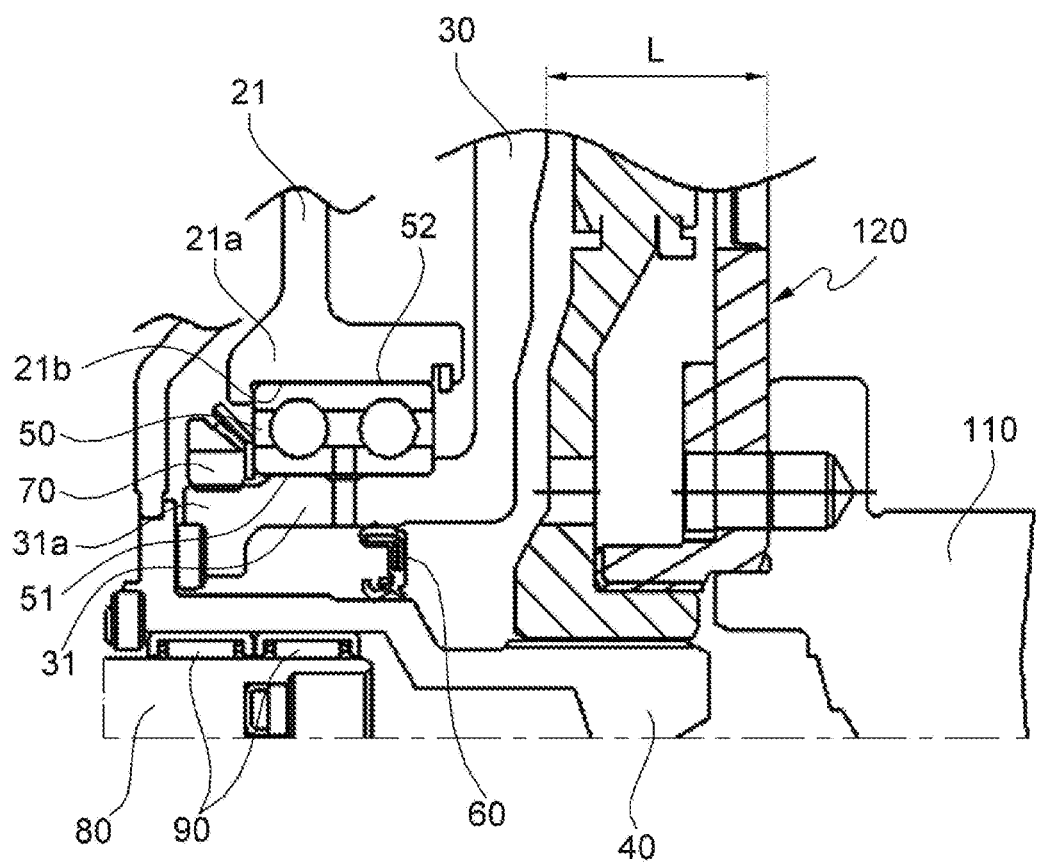
FIG. 3 is an enlarged view of a main part of the hybrid transmission structure according to the exemplary embodiment of the present invention.

FIG. 2 is a cross-sectional side view illustrating a hybrid transmission structure according to an exemplary embodiment of the present invention, and FIG. 3 is an enlarged view of a main part of the hybrid transmission structure according to the exemplary embodiment of the present invention.

The hybrid transmission structure according to the present invention includes a housing 10, a motor 20 mounted in the housing 10 and including a rotor 21 and a stator 22, a cover 30 coupled to the housing 10, and a support member 50 configured to support the rotor 21 so that the rotor 21 is rotatable.

Specifically, the motor 20 is mounted in the housing 10. The cover 30 is coupled to the housing 10 having the motor 20 mounted therein. As the cover 30 is coupled to the housing 10, the motor 20 is isolated from the outside. For example, the cover 30 and the rotor 21 of the motor 20 may be assembled in various ways such as welding, press-fitting and bolting.

The motor 20 includes the rotor 21 and the stator 22. The rotor 21 may be rotated in the stator 22. The stator 22 is fixed in the housing 10. A first boss 21a is provided at a center of the rotor 21. The support member 50 is coupled to an inner portion of the first boss 21a. For example, the support member 50 may be a bearing.

Specifically, an inner race 51 of the support member 50 is fixedly coupled to a second boss 31 provided at a center of the cover 30. An outer race 52 of the support member 50 is correspondingly coupled to a receiving portion 21b provided in the first boss 21a. The rotor 21 may be rotated in a state in which the first boss 21a is coupled to the outer race of the support member 50.

The second boss 31 of the cover 30, which is axially installed on a power shaft 40, is coupled to the inner race 51 of the support member 50.

A sealing member 60 is provided between the power shaft 40 and the second boss 31. For example, the sealing member 60 may be an oil seal. The sealing member 60 serves to prevent a leakage of lubricating oil.

The support member and the sealing member are disposed in a line in the hybrid transmission structure in the related art, but according to the present invention, the sealing member 60 is positioned on the inner race 51 of the support member 50.

Since the sealing member 60 is positioned on the inner race 51 of the support member 50 as described above, it is possible to reduce a horizontal width of the first boss 21a in comparison with the configuration in the related art in which the support member and the sealing member are disposed in a line.

For example, when the support member and the sealing member are assembled in a line as in the related art, the horizontal width of the first boss 21a needs to be increased to couple the sealing member 60. However, according to the present invention, since the sealing member 60 is assembled to the inner race 51 of the support member 50, it is not necessary to increase the horizontal width of the first boss 21a to mount the sealing member 60.

According to the present invention, since the first boss 21a does not require a region for installing the sealing member 60, the horizontal width of the first boss 21a is reduced. Therefore, it is possible to naturally reduce an overall length of the vehicle.

The present invention further includes a coupling member 70. For example, the coupling member 70 may be a nut. The coupling member 70 is thread-coupled to a tip 31a of the second boss 31. The tip 31a is exposed through the inner race 51 of the support member 50.

The support member 50 may be securely fixed to the second boss 31 by the coupling member 70. Since the support member 50 is securely fixed by the coupling member 70, it is possible to minimize vibration that occurs while the rotor 21 rotates.

Since the support member 50 is securely fixed by the coupling member 70, the rotor 21, which is assembled concentrically with a transmission input shaft 80, may be smoothly rotated.

Meanwhile, the power shaft 40 has a hollow shaft structure. The transmission input shaft 80 is inserted into the power shaft 40. For example, a support bearing 90 may be provided between the transmission input shaft 80 and the power shaft 40. A damper clutch 130 is axially installed on the transmission input shaft 80.

A torsion damper 120 is mounted at a tip of the power shaft 40. The torsion damper 120 is connected to an engine 110. The torsion damper 120 and the engine 110 may be connected in a way such as bolting.

As illustrated in FIG. 3, since the sealing member 60 such as an oil seal is positioned on the inner race 51 of the support member 50, the torsion damper 120 may be assembled to be maximally close to the cover 30.

Therefore, in comparison with the related art, it is possible to minimize a distance L from the cover to the engine, and as a result, it is possible to greatly reduce an overall length of the vehicle.

As described above, according to the present invention, the sealing member may be designed to be mounted on the inner race of the support member, thereby reducing the overall length of the vehicle. In addition, according to the present invention, the coupling member may be thread-coupled to the tip of the second boss of the cover so as to securely fix the support member, thereby minimizing a sway of the rotor that occurs when the rotor rotates, and thus improving performance of the motor. In addition, according to the present invention, the distance from the cover to an engine may be minimized in comparison with the configuration in the related art in which the support member and the sealing member are disposed in a line, and as a result, it is possible to improve mountability of components mounted in a hybrid transmission.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the exemplary embodiments disclosed in the present invention and the accompanying drawings are intended not to limit but to describe the technical spirit of the present invention, and the scope of the technical spirit of the present invention is not limited by the exemplary embodiments and the accompanying drawings. The protective scope of the present invention should be construed based on the following claims, and all the technical spirit within the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A hybrid transmission structure comprising:
   a housing;
   a motor mounted in the housing, comprising a rotor and a stator, and having a first boss provided at a center of the rotor;
   a cover having a second boss provided at a center thereof;
   a support member having an inner race fixedly coupled to the second boss, and an outer race inserted into a receiving portion in the rotor, and configured to support the rotor so that the rotor is rotatable; and
   a sealing member positioned between a power shaft and the second boss,
   wherein the second boss is positioned between the power shaft and the support member and inserted into the first boss a coupling member coupled to a tip of the second boss which is exposed through the inner race of the support member.

2. The hybrid transmission structure of claim 1, wherein the support member is a bearing.

3. The hybrid transmission structure of claim 1, wherein the sealing member is an oil seal.

4. The hybrid transmission structure of claim 1, wherein the coupling member is a nut thread-coupled to the tip of the second boss.

5. The hybrid transmission structure of claim 1, wherein a transmission input shaft is inserted into the power shaft, and a support bearing is provided between the transmission input shaft and the power shaft.

* * * * *